United States Patent [19]

Motl et al.

[11] Patent Number: 5,328,419
[45] Date of Patent: Jul. 12, 1994

[54] TWO-SPEED ALTERNATOR DRIVE

[75] Inventors: Dennis M. Motl, Ithaca; Theodore M. Joslin, Dryden, both of N.Y.

[73] Assignee: Borg-Warner Automotive, Inc., Sterling Heights, Mich.

[21] Appl. No.: 866,712

[22] Filed: Apr. 10, 1992

[51] Int. Cl.$^5$ .............................................. F16H 3/44
[52] U.S. Cl. .................................. 475/324; 475/323; 475/338; 475/339
[58] Field of Search ............... 475/323, 324, 159, 338, 475/339

[56] References Cited

U.S. PATENT DOCUMENTS

| | | | |
|---|---|---|---|
| 1,494,503 | 5/1924 | Rackham | 475/312 |
| 2,360,711 | 10/1944 | Orr | 475/324 |
| 2,751,788 | 6/1956 | Forrest | 475/311 |
| 2,901,925 | 9/1959 | Gunderson et al. | 475/323 OR |
| 4,774,857 | 10/1988 | Heine et al. | 475/324 X |
| 4,862,770 | 9/1989 | Smith | 475/324 |
| 5,011,464 | 4/1991 | White | 475/324 |
| 5,139,468 | 8/1992 | Churchill et al. | 475/324 |

FOREIGN PATENT DOCUMENTS

0031646 3/1927 France ................. 475/311

Primary Examiner—Leslie A. Braun
Assistant Examiner—Daniel Wittels
Attorney, Agent, or Firm—Reising, Ethington

[57] ABSTRACT

The two-speed transmission (10) for driving an alternator or other engine accessory includes an enclosed gear case (12). An output shaft (28) passes through both ends of the gear case. Bearings (30, 32) supported on the gear case support the ends of the output shaft. A tubular input shaft (64) surrounds the output shaft and is journaled on the output shaft between the two output shaft support bearings. A planet gear carrier (86) is rotatably journaled on the output shaft inside the gear case. Compound planet gears (112) are rotatably supported by the planet gear carrier (86) with one planet (116) of each compound planet gear in mesh with a sun gear (84) on the tubular input shaft (64) and with a planet (118) of each compound planet gear in mesh with a sun gear (94) on the output shaft (28). A brake assembly (124, 136 and 142) is either applied to lock the planet gear carrier (86) to the gear case or is released to let the planet carrier rotate in the gear case. When the tubular input shaft (64) is driven and the brake assembly holds the planet carrier (86), torque is transmitted from the input shaft to the input sun gear (84) to the first planet gear (116) to the second planet gear (118) to the output sun gear (94) and to the output shaft (28). When the brake assembly is released, torque passes from the tubular input shaft (64) directly to the output shaft (28) through a one-way clutch (67) and the input and output shafts run at the same speed. A lubrication system lubricates critical bearings in the transmission.

13 Claims, 5 Drawing Sheets

TWO-SPEED ALTERNATOR DRIVE

TECHNICAL FIELD

The invention relates to a two-speed transmission for transmitting torque from a power source to a driven accessory such as an alternator, a compressor, or a pump.

BACKGROUND OF THE INVENTION

Internal combustion engines are capable of operating over a wide speed range, that varies from a few hundred to several thousand revolutions per minute. Accessories that are commonly driven by internal combustion engines, such as alternators, compressors for air conditioners and air brakes and pumps for steering systems, suspension systems or control systems are most efficient if operated over a speed range that is narrower than the speed range of many internal combustion engines. The problem is solved in some industrial engine applications by running the internal combustion engine at a constant speed. Constant speed operation is only practical for engines that operate under a substantial load all or most of the time. In most applications, internal combustion engines are required to operate over a wide speed range. A two-speed accessory drive can drive accessories at sufficient speed to provide adequate performance during low engine speed operation and to drive accessories at allowable operating speeds during high engine speed operation.

The size of an engine accessory generally depends upon the required output and the operating speed. Since the required output is often relatively constant, the size and weight of accessories can be a function of the operating speed. Increasing the speed at which an accessory for an internal combustion engine runs makes it possible to design accessories that are smaller in overall size and have less weight. The size and weight of engine accessories is an important factor in efforts to reduce vehicle weight and to improve vehicle efficiency.

Two-speed accessory drives have been proposed for running internal combustion engine accessories. These drives have had two serious drawbacks. The gears generate noise, especially at high operating speeds. Gear wear and drive reliability have been less than satisfactory. These problems have resulted in part from misalignment of the gears in the two speed drives.

SUMMARY OF THE INVENTION

An object of the invention is to provide a two-speed transmission for driving an accessory at high speed.

Another object of the invention is to provide a two-speed transmission for driving an accessory that produces minimal noise.

A further object of the invention is to provide a two-speed transmission for an accessory that is durable and has a long useful life.

A still further object of the invention is to provide a two-speed transmission for transmitting torque from a power source to a driven accessory that maintains alignment between the gears.

The two speed transmission has an enclosed gear case that is mounted directly on an accessory that is to be driven. The gear case has a central axis that is concentric with the axis of rotation of an accessory drive shaft that is driven by the transmission. An output shaft, with an axis of rotation that is concentric with the central axis of the gear case, has a rear portion that is supported by a bearing mounted on the rear wall of the gear case. An output sun gear is integral with the rear portion of the output shaft. A tubular input shaft slides over the forward end of the output shaft. The tubular input shaft is rotatably journaled on the output shaft for rotation relative to the output shaft about an axis that is concentric with central axis of the gear case. The forward end of the tubular input shaft has an input drive pulley attached. The rear end of the tubular input shaft includes an integral input sun gear. The forward end of the output shaft is supported by a bearing in a bracket attached to the gear case.

The front wall of the gear case has a central opening. A seal is held in the central opening in the front wall and contacts a central portion of the tubular input shaft between the drive pulley which is outside the gear case and input sun gear which is inside the gear case.

A planet gear carrier is journaled on the output shaft, inside the gear case, between the rear wall of the gear case and the output sun gear. Four compound planet gear support shafts are attached to the planet gear carrier. A compound planet is journaled on each planet gear support shaft. Each compound planet includes a first planet gear in mesh with the input sun gear and an integral second planet gear in mesh with the output sun gear.

A brake is mounted inside the gear case. A brake actuator is mounted on the outside of the gear case and is connected to the brake. The actuator can apply the brake to hold the planet carrier in a fixed position relative to the gear case. The actuator can also release the brake and allow the planet carrier to rotate relative to the gear case.

Torque is transmitted from an input drive pulley to the tubular input shaft and through a one way clutch to the output shaft when the brake is released and the planet carrier is free to rotate in the gear case. The driven shaft of an accessory with splines engages splines in a bore in the rear portion of the output shaft. The splines transmit torque from the output shaft to the accessory. When the brake is engaged and the planet carrier is held in a fixed position, torque is transmitted from the input drive pulley and the tubular input shaft to the input sun gear. The input sun gear drives one or more compound planet gears. The compound planet gears drive the output sun gear. The output sun gear transmits torque to the output shaft and to the accessory drive shaft. The one way clutch connecting the tubular input shaft to the output shaft is not engaged because the output shaft is rotated faster than the tubular input shaft rotates.

The rotating gears in the gear case pick up oil in the bottom of the gear case and throw the oil outwardly toward the walls of the gear case. Some of the oil is caught in an oil retainer in an upper portion of the gear case. Oil flows out of the oil retainer through a passage to the forward end of the output shaft. A bore in the output shaft receives the oil from the oil retainer. Oil in the bore lubricates the spines in the bore, the one way clutch, the bearings which mount the tubular input shaft on the output shaft and the two sun gears. Excess oil which flows out of the tubular input shaft is caught by a circular flange carried by the planet carrier. The circular flange directs the oil to oil passages in four planet gear support shafts. The oil passages in the compound planet gear support shafts direct oil to bearings which rotatably support the compound planets on the planet gear support shafts.

The foregoing and other objects, features and advantaged of the present invention will become apparent in the light of the following detailed description of an exemplary embodiment thereof, as illustrated in the accompanying drawing.

DESCRIPTION OF THE PREFERRED EMBODIMENT

The two-speed transmission 10 includes an enclosed gear case 12. The gear case 12 includes a casting with a front wall 14 and an integral generally cylindrical side walls 16. A rear wall 18 of the gear case is a plate member attached to the side walls 16 by several bolts 20. The gear case has a central axis 22. A circular aperture 24 in the rear wall 18 and a circular aperture 26 in the front wall 14 of the gear case are concentric with the central axis 22.

An output shaft 28 has a rear portion supported in a ball baring 30 and a front portion supported by a needle bearing 32. The ball bearing 30 has an inner race 34 that is pressed on the output shaft 28 until it contacts a surface 36. A snap ring 38 holds the output shaft 28 in the inner race 34. The outer race 40 of the ball bearing 30 is pressed into the circular aperture 24 in the rear wall 18 of the gear case. A lock ring 42 in a groove in the outer race 40 contacts an outside surface of the rear wall 18 to limit forward movement of the ball bearing 30 in the circular aperture 24. A ring shaped retainer 44 is secured against the locking ring 42 by screws 46 to retain the ball bearing in the circular aperture 24 and to prevent axial movement of the ball bearing 30 relative to the enclosed gear case 12.

The needle bearing 32 supporting the front portion of the output shaft 28 is pressed into a bore 48 in a bracket 50. The bracket 50 includes a forward portion 52 and a rear portion 54 that contacts the enclosed gear case 12. A dowel 53 aligns the bracket 50 with the gear case 12. Bolts 55 attach the bracket 50 to the gear case 12. A brace 56 is attached to the bracket 50 by bolts 58 and to the enclosed gear case 12 by a bolts 60. The brace 56 insures that the needle bearing 32 remains in a fixed position relative to the central axis 22.

Figure 2:
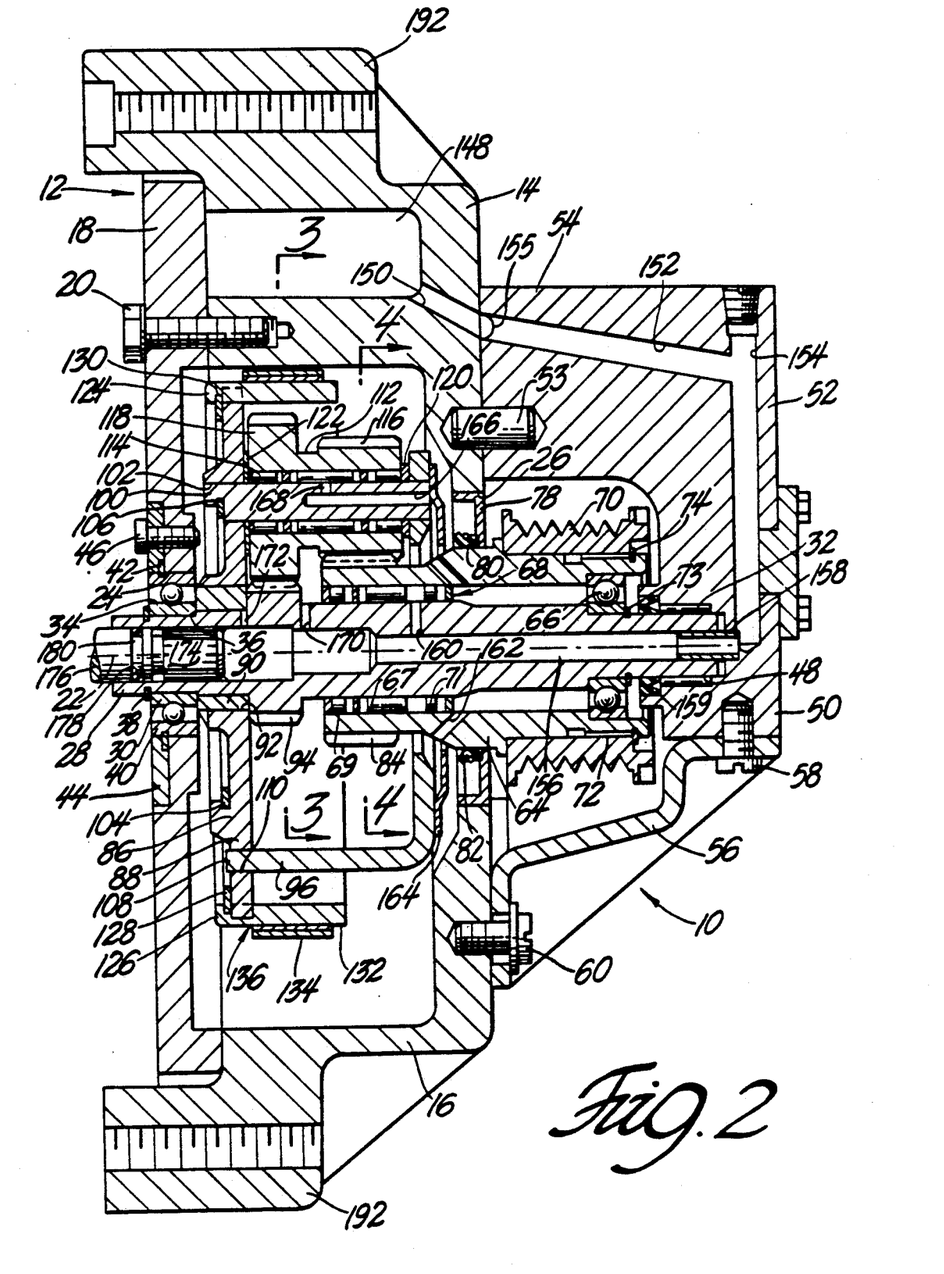
FIG. 2 is a sectional view taken along line 2—2 in FIG. 1.

A tubular input shaft 64 telescopes over the output shaft 28 and is rotatably supported on the output shaft 28 by a ball bearing 66 and by a needle bearing and one way clutch assembly 68. The needle bearing and one way clutch assembly 68 includes a one way clutch 67 and needle bearings 69 and 71. A lock ring 73 prevents axial movement of the ball bearing 66 on the output shaft 28. An input drive pulley 70 is fixed to the forward end of the tubular input shaft 64 by splines 72 and a snap ring 74. The input drive pulley 70 with a plurality of v-grooves, as shown in FIG. 2, is for use with a power band belt 76. Input drive pulleys for v-belts and even a sprocket or a gear could be substituted for the input drive pulley 70, if desired. The bracket 50 for supporting the needle bearing 32 must be positioned to accommodate the input drive for the tubular input shaft 64 that is employed. The brace 56 can be unbolted from the front wall 14 of the gear case 12 and from the bracket 50 to replace the power band belt 76 without removing the bracket and the needle bearing 32 which supports the forward end of the output shaft 28.

A seal 78 is pressed into a circular aperture 26 in the front wall 14 of the enclosed gear case 12. A flexible portion 80 of the seal 78 contacts a drum shaped surface 82 on the tubular input shaft 64. The drum shaped surface 82 is concentric with the central axis 22 and cooperates with the seal 78 to keep lubricant in the enclosed gear case 12 and to keep foreign material out of the enclosed gear case.

An input sun gear 84 is integral with the rear portion of the tubular input shaft 64 and is positioned inside the enclosed gear case. As shown, the outer diameter of the input sun gear is less than the diameter of the drum shaped surface 82. This arrangement allows the input sun gear 84 to pass through the center of the seal 78 during assembly and disassembly. The input sun gear 84 could be a separate gear fixed to the tubular input shaft 64 rather than an integral part of the tabular input shaft, if desired.

The planet gear carrier 86 includes a carrier end plate 88. The carrier end plate 88 has a central bearing 90 that is fixed to the carrier end plate 88 and is rotatably supported on a bearing surface 92 on the output shaft 28. The central bearing 90 and the attached carrier end plate 88 are axially fixed by contact between the inner race 34 of the ball bearing 30 and the central bearing 90 and contact between output sun gear 94 that is an integral part of the output shaft 28 and the central bearing 90. The inner race 34 and the output sun gear 94 do not, however, prevent rotation of the central bearing 90 relative to the output shaft 28 on the bearing surface 92.

Figure 3:
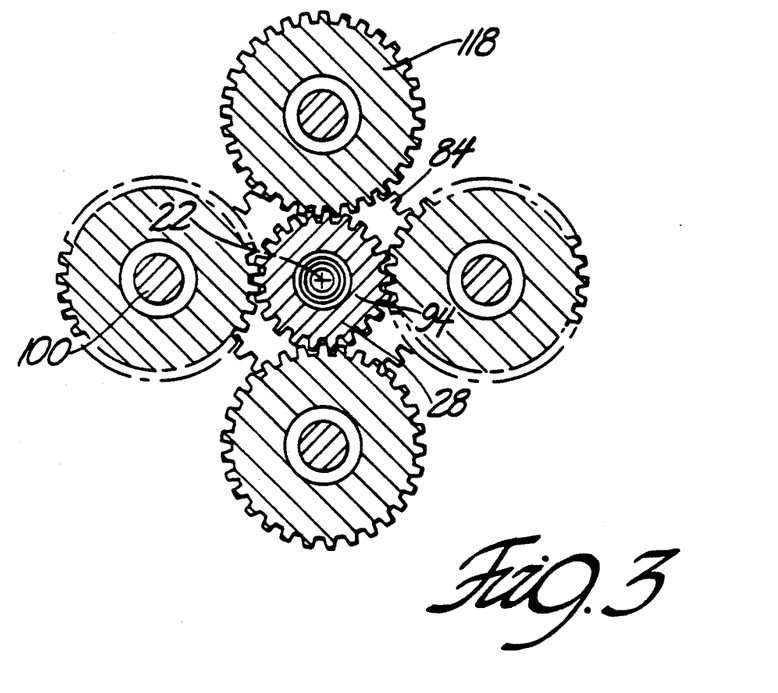
FIG. 3 is a sectional view of the output planet gears and the driven sun gear taken along the line 3—3 in FIG. 2.
Figure 4:
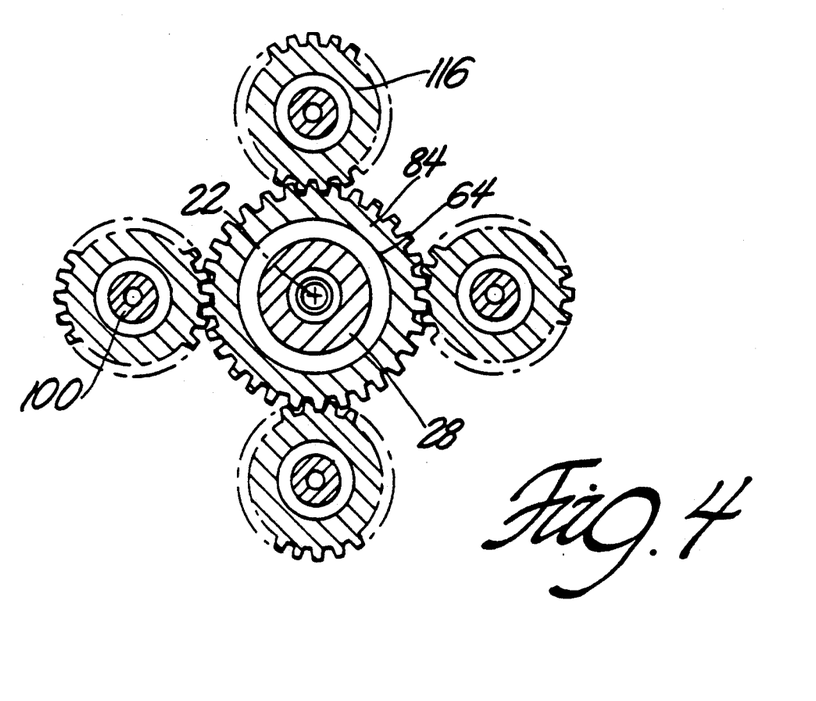
FIG. 4 is a sectional view of the input sun gear and the input planet gears taken along the line 4—4 in FIG. 2.
Figure 5:
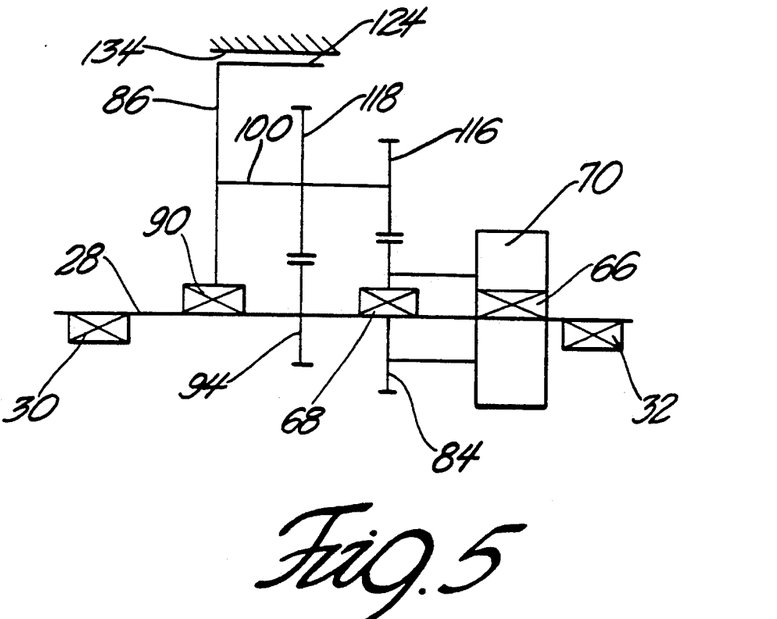
FIG. 5 is a schematic showing the input sun gear, the output sun gear, the compound planet gears which mesh with the sun gears, the compound planet carrier and brake, the bearings and the one way clutch.
Figure 6:
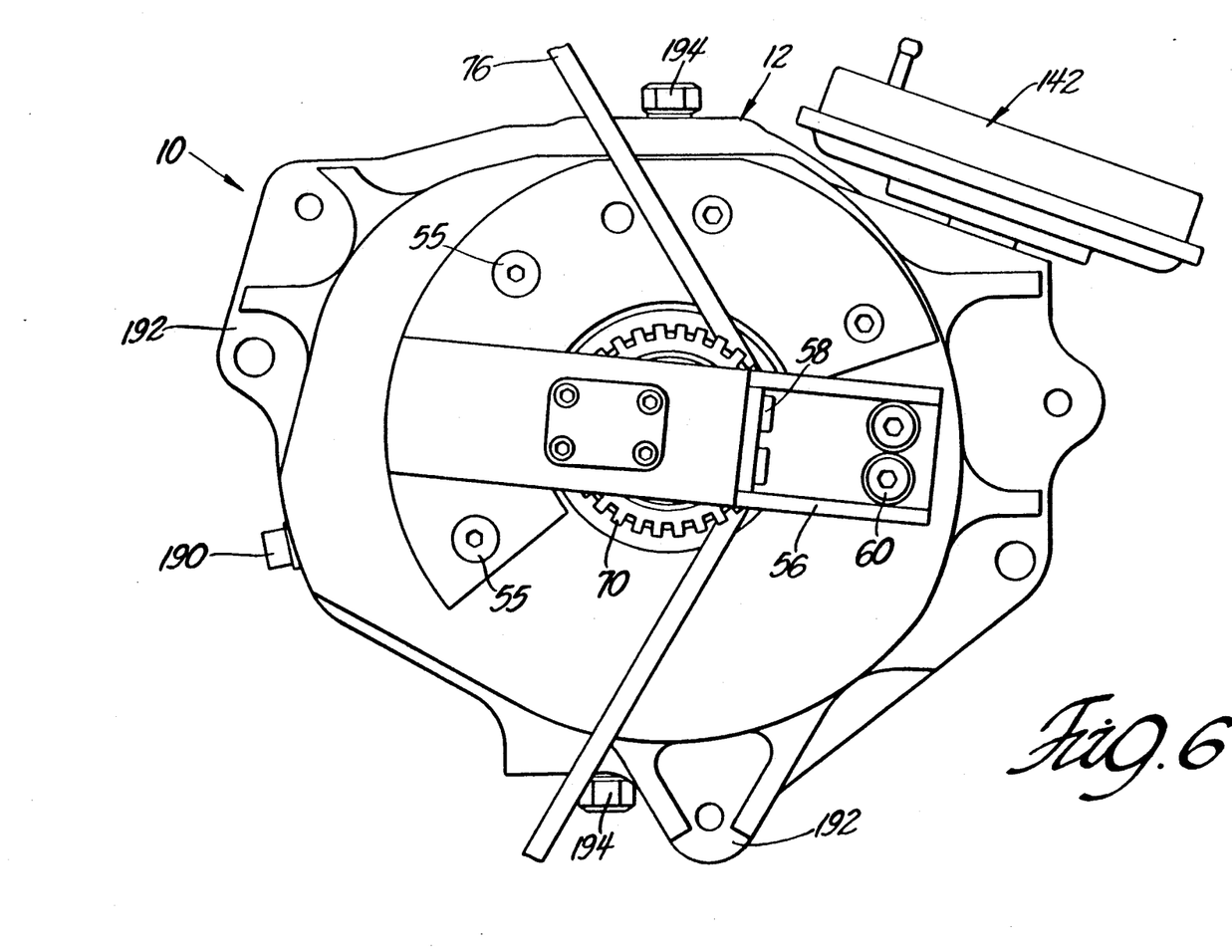
FIG. 6 is a front view of the two-speed transmission in FIG. 1.

A cup shaped member 96, with a central opening 98, concentric with the central axis 22 is attached to the front side of the carrier end plate 88. Four compound planet gear support shafts 100 are rigidly secured to the cup shaped member 96 and pass through bores 102 in the carrier end plate 88. The compound planet gear support shafts 100 are secured to the carrier end plate 88 by a snap ring 104 which engages grooves 106 in the rear ends of the compound planet gear support shafts 100 that extend through the bores 102 in the carrier end plate 88. The compound planet gear support shafts 100 are all an equal distance from the central axis 22. The compound planet gear support shafts 100 are also spaced 90 degrees from each other about the central axis 22, as shown in FIG. 3. Projections 108, on the cup shaped member 96 project, through apertures 110 in the carrier end plate 88. These projections 108 prevent rotation of the cup shaped member 96 relative to the carrier end plate 88.

A compound planet 112 is rotatably supported on each compound planet gear support shaft 100 by needle bearings 114. The compound planets 112 each have a first planet gear 116 in mesh with the input sun gear 84 and a second planet gear 118 in mesh with the output sun gear 94. Thrust washers 120 and 122 are provided on the compound planet gear support shafts 100 at each end of the compound planets 112 to limit axial movement of the compound planets.

Figure 1:
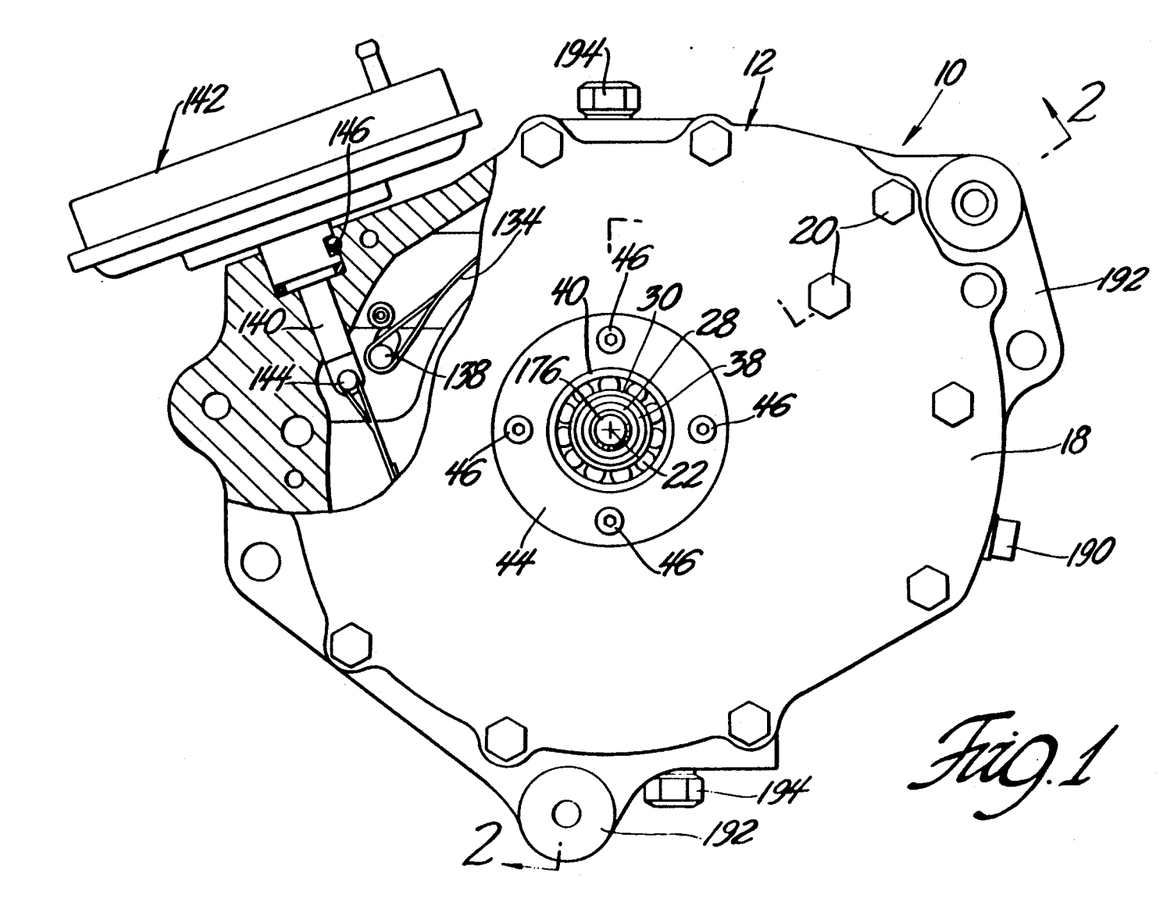
FIG. 1 is a rear view of a two-speed transmission for driving an accessory with parts broken away to show the brake band and the brake actuator assembly.

A brake drum 124 has projections 126 that engage slots in the outer periphery of the carrier end plate 88. A snap ring 128 engages a slot 130 in the projections 126 to hold the brake drum 124 on the carrier end plate 88. An outer cylindrical surface 132 on the brake drum 124 is encompassed by a brake band 134. A friction material 136 is attached to the brake band 134 and is between the brake band 134 and the brake drum 124. One end of the brake band 134 is attached to a stationary pin 138 as shown in FIG. 1. The other end of the brake band 134 is attached to the actuator rod 140 of a brake actuator assembly 142 by a pin 144. The brake actuator assembly 142, as shown, is a vacuum motor and is attached to the enclosed gear case 12 by a pin 146. When the brake actuator assembly 142 is activated to apply tension to the brake band 134, the planet gear carrier 86 is held in a fixed position relative to the enclosed gear box 12. When the brake actuator assembly 142 is activated to release tension on the brake band 134, the planet gear carrier 86 can rotate about the central axis 22 of the enclosed gear case 12. The vacuum motor of the brake band actuator assembly 142 can employ vacuum to tighten and to loosen the brake band 134 or the actuator rod 140 can be spring loaded in one direction. The brake actuator assembly 142 could employ a solenoid, or a hydraulic cylinder in place of the vacuum motor. It would also be possible to manually tighten and loosen the brake band 134, if desired.

The lubrication system for the two speed transmission 10 includes an oil retainer 148. The oil retainer includes a walled enclosure, with one side that is partially open, in the upper portion of the enclosed gear case 12. The oil retainer 148 is positioned in the enclosed gear case 12 in a position in which the partially open side can catch lubricant which is thrown out against the walls of the enclosed gear case by the compound planets 112 and by the planet gear carrier 86. The walls of the oil retainer 148 form a small reservoir which can retain some lubricant and keep it from draining directly back to the bottom of the enclosed gear case 12. Lubricant which is retained by the oil retainer 148 enters a passage 150 through the front wall 14 of the enclosed gear case 12. The passage 150 is connected to passages 152 and 154 in the bracket 50 by an arcuate groove passage 155. The arcuate groove 155 allows the bracket 50 to be placed in various positions relative to the housing 12 where it will not interfere with the power band belt 76. The passages 150, 152, 154 and 155 allow oil to flow from the oil retainer 148 to a bore 156 in the output shaft 28. A connector tube 158 connects the bore 156 to the passage 154 to insure that the needle bearing 32 does not receive excessive lubricant. Leakage past the connector tube 158 provides sufficient lubrication for the needle bearing 32. A seal 159 retains oil in the needle bearing 32. Some of the lubricant which enters the bore 156 in the output shaft 28 flows through a radial passage 160 to lubricate the needle bearings 69 and 71, the one way clutch 67 and the ball bearing 66. The ball bearing 66 has a front seal, which is not shown, to prevent the escape of lubricant from the enclosed gear case 12.

Lubricant in the tubular input shaft 64 flows out of the tubular input shaft 64 through a radial passage 162. Lubricant, which passes through the radial passage 162, is caught in a circular flange 164 carried on the forward wall of the planet gear carrier 86. Lubricant which is caught in the circular flange 164 is directed into passages 166 and 168 in the compound planet gear support shafts 100. The lubricant which passes through the passages 166 and 168 in the compound planet gear support shafts 100, lubricates the needle bearings 114. After the lubricant passes through the needle bearings 114, it also lubricates the thrust washers 120 and 122.

Lubricant in the bore 156 in the output shaft 28 passes through a radial passage 170 between the first planet gear 116 and the second planet gear 118. The lubricant which passes through the radial passage 170 lubricates the second planet gear 118 and the output sun gear 94. The input sun gear 84 and the first planet gears 116 are lubricated by lubricant from the radial passage 170, from the radial passage 162 and by lubricant which is splashed from the bottom of the enclosed gear case.

Lubricant in the bore 156 in the output shaft 28 can also pass through a radial passage 172. The radial passage 172 supplies lubricant to the central bearing 90 for the planet gear carrier 86. Lubricant in the bore 156 in the output shaft 28 also lubricates the splines 174 in the rear portion of the output shaft 28. An accessory drive shaft 176, a portion of which is shown in FIG. 2, closes the rear end of the bore 156. Splines on the accessory drive shaft 176 engage splines 174 in the output shaft 28 to the transmit torque from the output shaft 28 to the accessory drive shaft 176. An o-ring 178 in a groove 180 in the accessory drive shaft 176 seals between the accessory drive shaft and the inside surface of the bore 156 in the output shaft 28 to prevent leakage of lubricant from the enclosed gear case 28.

A threaded bore is provided in the enclosed gear case 12. Lubricant, for lubricating the gears, bearings and shafts in the enclosed gear case 12, is poured into the gear case through the threaded bore. The threaded bore is closed by a threaded plug 190 in FIG. 1. An oil drain plug 195 and a gear case breather 194 are also provided in the enclosed gear case. Attachment members, such as the lug 192, are provided on the enclosed gear case 12 for attaching the two speed transmission 10 to a support frame or to an accessory that is driven by the transmission.

During operation of the two speed transmission 10, the input drive pulley 70 is driven by a power band belt 76 or other suitable torque transmission members. The power band belt 76 transmits torque from an internal combustion engine or other power source to the two-speed transmission. The input drive pulley 70 rotates the tubular input shaft 64. When the brake band 134 is loose and the planet gear carrier 86 is free to rotate, the one way clutch 67 transmits torque from the tubular input shaft 64 to the output shaft 28. The output shaft 28 is rotated at the same speed as the tubular input shaft 64 and an accessory drive shaft 176, in engagement with the splines 174 in a bore 156 in the output shaft 28, rotates at the same speed as the tubular input shaft. The output torque is substantially the same as the input torque to the input drive pulley 70. Internal losses in the two-speed transmission 10 are negligible when the planet gear carrier 86 is free to rotate.

During low speed operation of the internal combustion engine or other power source driving the two-speed transmission 10 the accessory drive shaft 176 can be run at a higher speed to increase the output of a driven accessory by tightening the brake band 134. When the brake is applied by tightening the brake band 134, the planet gear carrier 86 is held stationary relative to the enclosed gear case 12. Torque is transmitted from the input drive pulley 70 to the tubular input shaft 64 to the input sun gear 84 to the compound planets 112. The first planet gear 116 of the compound planets 112 transmit torque from the input sun gear 84 to the second planet gear 118 to the output sun gear 94. The second planet gear 118 rotates at the same rotational speed as the first planet gear 116. The output sun gear 94 is rotated at a higher rotational speed than the input sun gear 84. The output shaft 28 and the integral output sun gear 94 run at a higher speed than the tubular input shaft 64. The one way clutch 67, which can also be referred to as an over running clutch, disengages and allows the output shaft 28 to run faster than the tubular input shaft 64.

The rotational speed of the output shaft 28, when the brake band 134 is loose and the planet gear carrier 86 is free to rotate, is the same as the rotational speed of the tubular input shaft 64. When the brake band 134 is tight and the planet gear carrier 86 can not rotate relative to the enclosed gear case 12, the speed of rotation of the output shaft $O_s$ can be determined by the following equation:

$$O_s = I_s \times \frac{PD_{is}}{PD_{pg1}} \times \frac{PD_{pg2}}{PD_{os}}$$

In the equation $I_s$ is the rotational speed of the tubular input shaft 64, $PD_{is}$ is the pitch diameter of the input sun gear 84, $PD_{pg1}$ is the pitch diameter of the first planet gears 116, $PD_{pg2}$ is the pitch diameter of the second planet gears 118, and $PD_{os}$ is the pitch diameter of the output sun gear 94. The various pitch diameters must be chosen to provide an output shaft 28 rotation speed $O_s$ that exceeds the rotational speed $I_s$ of the tubular input shaft 64. The input sun gear 84 must, therefore, have a larger pitch diameter than the pitch diameter of the output sun gear 84. If the output shaft 28 does not rotate at a speed which equals or exceeds the speed at which the tubular input shaft 64 rotates, the one way clutch 67 will engage.

There are four compound planets 112 shown in FIG. 3 of the drawing. The number of compound planets 112 can be increased, if required, to transmit the required torque and if there is space available for the planet gears around the sun gears. The number of compound planets 112 can also be decreased if less than four compound planets 112 can transmit the required torque. The individual compound planets 112 and the compound planet gear support shafts 100 should be spaced around the central axis 22 so that the planet gear carrier 86 and the compound planets 112 carried by the planet gear carrier are balanced to prevent vibration.

Helical teeth can be used on the input sun gear 84, the output sun gear 94, the first planet gear 116 and the second planet gear 118. Helical gears have high contact ratios which reduce noise generation by the gear teeth. Gears with helical teeth produce axial thrust loads. These axial thrust loads must be countered to keep the gears in alignment with each other and to reduce frictional drag. Thrust washers 120 and 122 limit axial movement of the compound planets 112. Axial movement of the planet gear carrier 86 is limited by central bearing 90 that is positioned between the inner race 34 of the ball bearing 30 and the output sun gear 94. Axial movement of the output shaft 28 is limited by the ball bearing 30 which is axially fixed in the rear wall 18 of the enclosed gear case 12 by the lock ring 42 and the ring shaped retainer 44. Axial movement of the tubular input shaft 64 and the integral input sun gear 84 is limited by the ball baring 66 and the lock ring 73. It is preferable to employ helical gears that tend to move tubular input shaft 64 forward and that tend to move the planet gear carrier 86 toward the rear wall 18 of the enclosed gear case 12.

The preferred embodiment of the invention has been described in detail but is an example only and the invention is not restricted thereto. It will be easily understood by those skilled in the art that modifications and variations can easily be made within the scope of this invention.

We claim:

1. A two-speed transmission comprising a transmission housing having a front wall, a rear wall and a central axis passing through the front wall and the rear wall; a first shaft with an axis that is concentric with the central axis, a bearing rotatably supporting a rear portion of the first shaft on the rear wall, a bearing rotatably supporting a front portion of the first shaft on the front wall, a sun gear on the first shaft and connector means on the rear portion of the first shaft for connecting the first shaft to a torque transmission means; a tubular second shaft with a central bore that is concentric with the central axis of the transmission housing and has the first shaft passing through the central bore, bearing means rotatably supporting the tubular second shaft on the first shaft, a sun gear on the tubular second shaft, drive means on the tubular second shaft for connecting the tubular second shaft to torque transmission means, and a one way clutch mounted between the first shaft and the tubular second shaft and operable to permit relative rotation between the first shaft and the tubular second shaft in one direction and to prevent relative rotation in another direction; a planet gear carrier, with at least one attached compound planet gear support shaft, rotatably supported in the transmission housing for rotation about the central axis; a compound planet rotatably supported by the compound planet gear support shaft and having a first integral planet gear in mesh with the sun gear on the tubular second shaft and a second integral planet gear in mesh with the sun gear on the first shaft; and brake means mounted in the transmission housing operable to prevent rotation between the transmission housing and the planet gear carrier when the brake is engaged and operable to permit rotation of the planet gear carrier when the brake is released.

2. The two speed transmission of claim 1 wherein the connector means on the rear portion of the first shaft for connecting the first shaft to a torque transmission means includes a splined bore in the first shaft.

3. The two speed transmission of claim 1 wherein the drive means on the tubular second shaft for connecting the tubular second shaft to torque transmission means is a pulley.

4. The two-speed transmission of claim 1 wherein the first shaft is an output shaft.

5. The two-speed transmission of claim 1 wherein the tubular second shaft is a torque input shaft.

6. The two-speed transmission of claim 4 wherein the tubular second shaft is a torque input shaft.

7. The two-speed transmission of claim 1 wherein a plurality of compound planet gear support shafts are attached to the planet gear carrier and a compound planet gear is rotatably supported by each compound planet gear support shaft.

8. The two-speed transmission of claim 1 wherein the brake means includes a friction surface on the planet gear carrier and a friction member anchored to the transmission housing and engagable with the friction surface on the planet gear carrier.

9. The two-speed transmission of claim 1 wherein the brake means includes a brake drum on the planet gear carrier, a brake band which partially surrounds the brake drum and a brake actuator connected to the brake band and operable to tension or loosen the brake band.

10. The two-speed transmission of claim 1 wherein the sun gears and the first and second planet gears are helical gears.

11. The two speed transmission of claim 10 including retainer means to limit axial movement of the first shaft relative to the transmission housing, lock means to limit axial movement between the first shaft and the tubular second shaft and thrust washers to limit axial movement between the compound planets and the sun gears.

12. The two-speed transmission of claim 1 including a lubrication system for supplying lubricant to the bearings which support the tubular second shaft on the first shaft.

13. The two-speed transmission of claim 12 wherein the lubrication system includes an oil retainer which catches lubricant and passages which convey lubricant from the oil retainer to a bore in the first shaft, and passages in the first shaft which direct oil from the bore in the first shaft to bearings which require lubricant.

* * * * *